(12) United States Patent
Jung et al.

(10) Patent No.: US 8,104,599 B2
(45) Date of Patent: Jan. 31, 2012

(54) HAND-OPERATED CONTROL LEVER RELEASE APPARATUS FOR TRANSMISSION

(75) Inventors: Yong-Eon Jung, Gyeongsan (KR); Hong-Jun Cha, Gyeongsan (KR)

(73) Assignee: SL Corporation, Daegu (KR)

( * ) Notice: Subject to any disclaimer, the term of this patent is extended or adjusted under 35 U.S.C. 154(b) by 545 days.

(21) Appl. No.: 12/328,904

(22) Filed: Dec. 5, 2008

(65) Prior Publication Data

US 2009/0151501 A1 Jun. 18, 2009

(30) Foreign Application Priority Data

Dec. 18, 2007 (KR) .......................... 10-2007-0133546

(51) Int. Cl.
*B60K 20/02* (2006.01)
*G05G 5/00* (2006.01)
(52) U.S. Cl. .................... 192/220.2; 192/220.7; 70/245; 74/473.23
(58) Field of Classification Search ............... 192/220.2, 192/220.3, 220.6, 220.7
See application file for complete search history.

(56) References Cited

U.S. PATENT DOCUMENTS

| 5,096,033 | A | * | 3/1992 | Osborn | ............................ 477/96 |
| 5,150,593 | A | * | 9/1992 | Kobayashi et al. | ............. 70/248 |
| 6,662,924 | B2 | * | 12/2003 | Giefer et al. | ............... 192/220.7 |
| 2004/0079613 | A1 | * | 4/2004 | Cho | ............................ 192/220.7 |

* cited by examiner

*Primary Examiner* — Richard M. Lorence
(74) *Attorney, Agent, or Firm* — Edwards Wildman Palmer LLP; Kongsik Kim

(57) ABSTRACT

A hand-operated control lever release apparatus for a transmission of a vehicle includes a housing, a manual release lever rotatably mounted in the housing, a brake cam which is rotatably coupled to the housing through the cam shaft and the rotation of which is restrained by the manual release lever, a first cable connecting the manual release lever to a control lever for the transmission and unlocking the control lever in response to rotation of the manual release lever, and a second cable connecting the brake cam with a brake pedal. According to the apparatus, the control lever for the electronic transmission can be manually unlocked in response to rotation of the manual release lever, thereby actuating the movement of the vehicle.

19 Claims, 12 Drawing Sheets

HAND-OPERATED CONTROL LEVER RELEASE APPARATUS FOR TRANSMISSION

CROSS-REFERENCE TO RELATED APPLICATION

This application claims priority from Korean Patent Application No. 10-2007-0133546 filed on Dec. 18, 2007, the disclosure of which is incorporated herein by reference in its entirety.

BACKGROUND

1. Technical Field

The present disclosure relates to a hand-operated control lever release apparatus for a transmission of a vehicle, which can manually unlock a transmission control lever in order to actuate the movement of the vehicle in the event of an emergency.

2. Background Art

A vehicle is equipped with a transmission to enable smooth parking or shifting of gears. To release movement of a vehicle in the event of an emergency, a transmission needs to be unlocked from parking (P) level.

Figure 1:
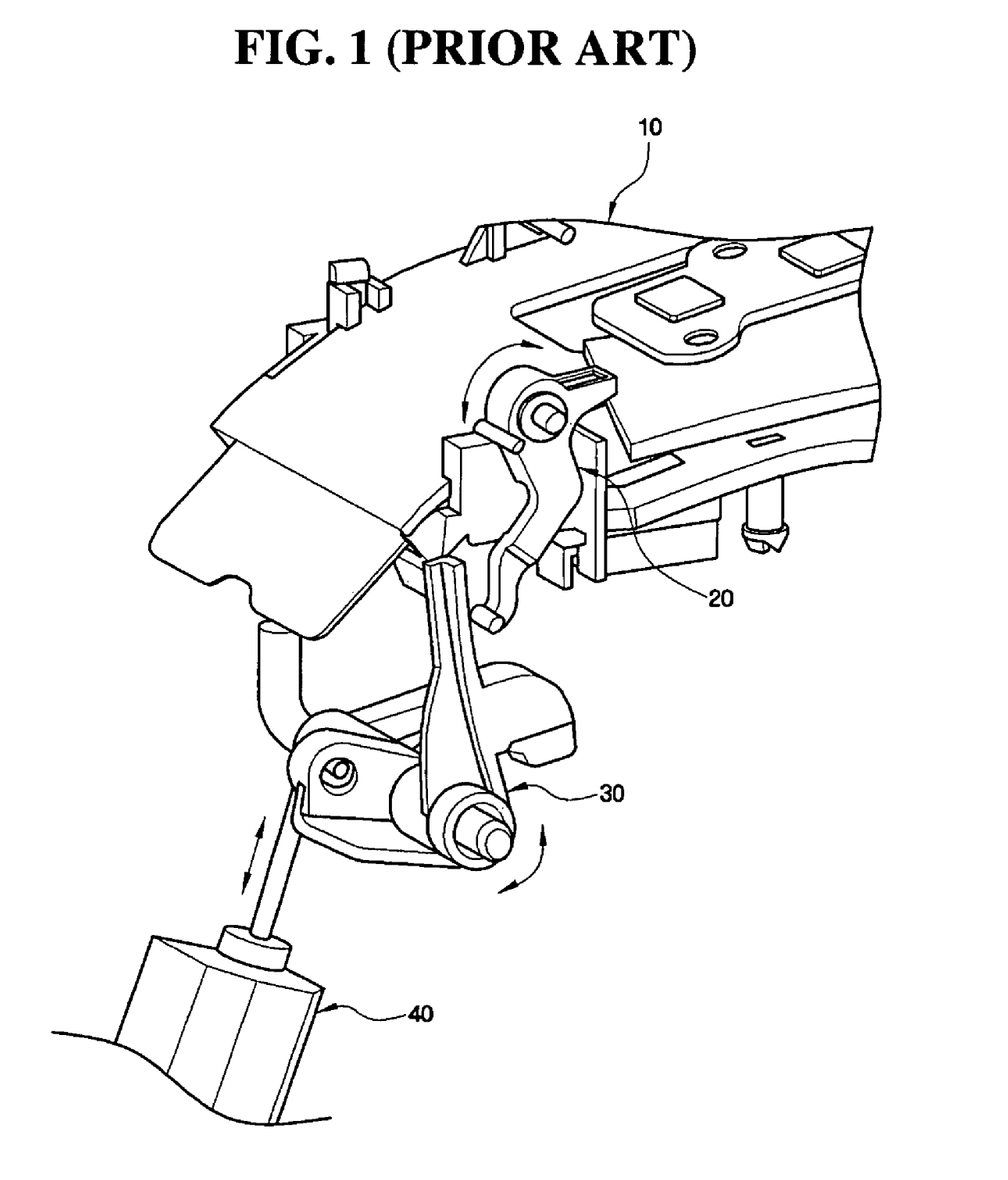
FIG. 1 is a schematic perspective view of a conventional hand-operated control lever release apparatus for a transmission of a vehicle.

FIG. 1 is a schematic perspective view of a conventional apparatus for manually unlocking a vehicle transmission lever.

Referring to FIG. 1, the conventional release apparatus is applied to a transmission mechanism using a cable. More specifically, in case where it is not possible to be unlocked from P position such as when a failure occurs when a transmission lever is at P position or for other reasons, the transmission lever can be unlocked from the P position by rotating a hand-operated release lever 20 mounted on a housing 10, which in turn rotates a lock cam 30 to push away a solenoid 40. Upon unlocking, the transmission lever becomes movable. That is, as the transmission lever and the cable move, a control lever for a transmission coupled to a distal end of the cable can shift from P position to Neutral (N) or Drive (D) position, thereby actuating the movement of the vehicle.

An electronic transmission typically starts to operate upon detecting a signal unique for each shift position and applying the signal thereto. For example, a signal generated at P position may be transmitted to a transmission so that a control lever can rotate and be locked at P position.

However, the electronic transmission has a drawback in that a vehicle cannot move in the event of an emergency such as battery discharge or software failure because the control lever fails to be unlocked from P position. Furthermore, as the electronic transmission has a structure in that a transmission lever is not coupled to a control lever for the transmission via a cable, the control lever may not be released from P position even though the transmission lever is free to move, which prevents movement of the vehicle.

Accordingly, there is a need for a hand-operated control lever release apparatus for an electronic transmission which can manually unlock a transmission control lever from P position in order to actuate movement of the vehicle in the event of an emergency.

The above information disclosed in this Background section is only for enhancement of understanding of the background of the invention and therefore it may contain information that does not form the prior art that is already known in this country to a person of ordinary skill in the art.

SUMMARY

The present invention provides a hand-operated control lever release apparatus for an electronic transmission of a vehicle, which can manually unlock the electronic transmission in order to actuate movement of the vehicle in the event of an emergency.

The above and other objects of the present invention will be described in or be apparent from the following description of the preferred embodiments.

According to an aspect of the present invention, there is provided a hand-operated control lever release apparatus for a transmission of a vehicle, the apparatus including a housing, a manual release lever rotatably mounted in the housing, a brake cam which is rotatably coupled to the housing through the cam shaft and the rotation of which is restrained by the manual release lever, a first cable connecting the manual release lever to a control lever for the transmission and being able to unlock the control lever in response to rotation of the manual release lever, and a second cable connecting the brake cam with a brake pedal.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, hand-operated control lever release apparatuses for a transmission of a vehicle according to embodiments of the present invention will be described with reference to the accompanying drawings. In describing the present invention, well known functions or structures will not be explained so as not to unnecessarily obscure aspects of the present invention.

Figure 2:
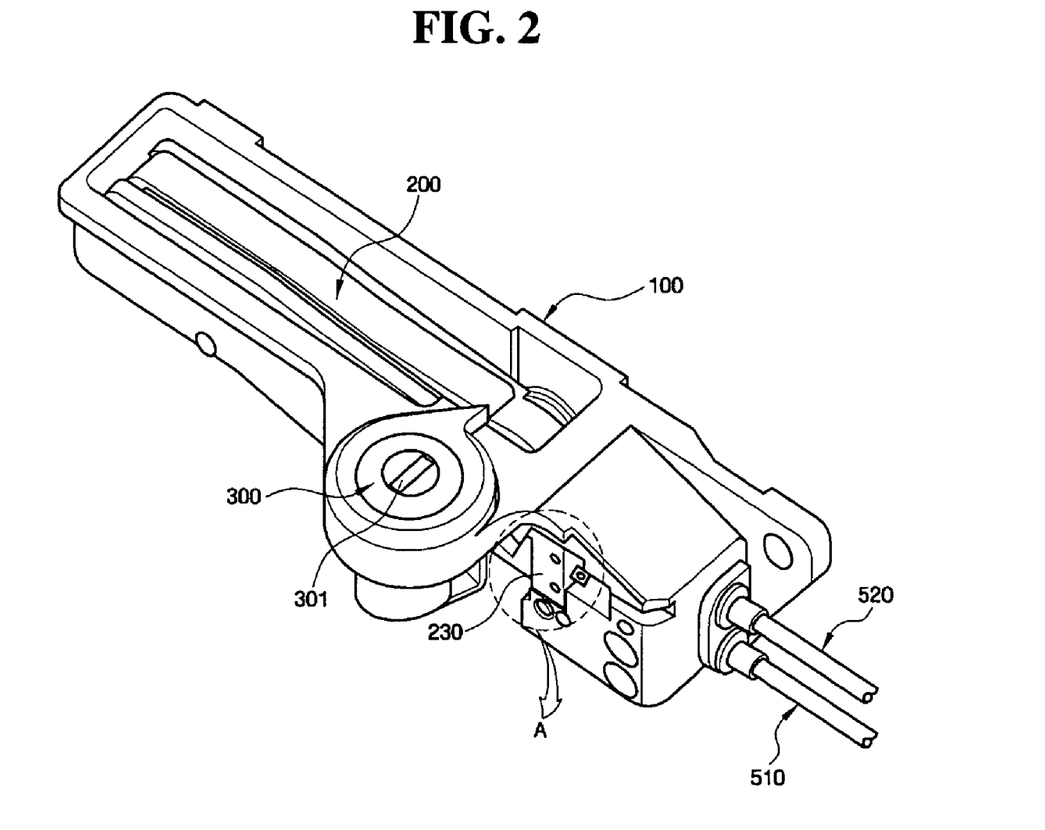
FIG. 2 is a schematic perspective view of a hand-operated control lever release apparatus for a transmission of a vehicle according to an embodiment of the present invention.
Figure 3:
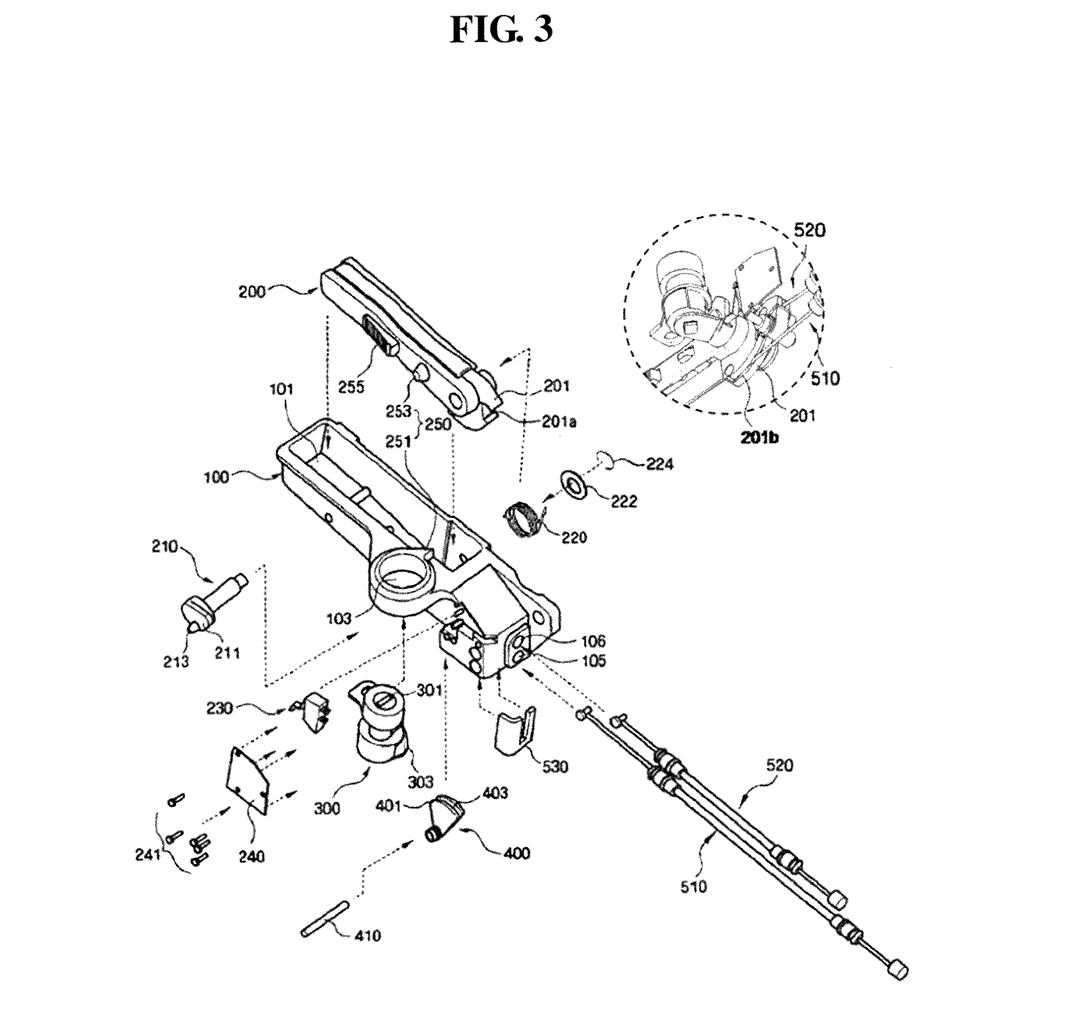
FIG. 3 is an exploded perspective view of the apparatus of FIG. 2.
Figure 4:
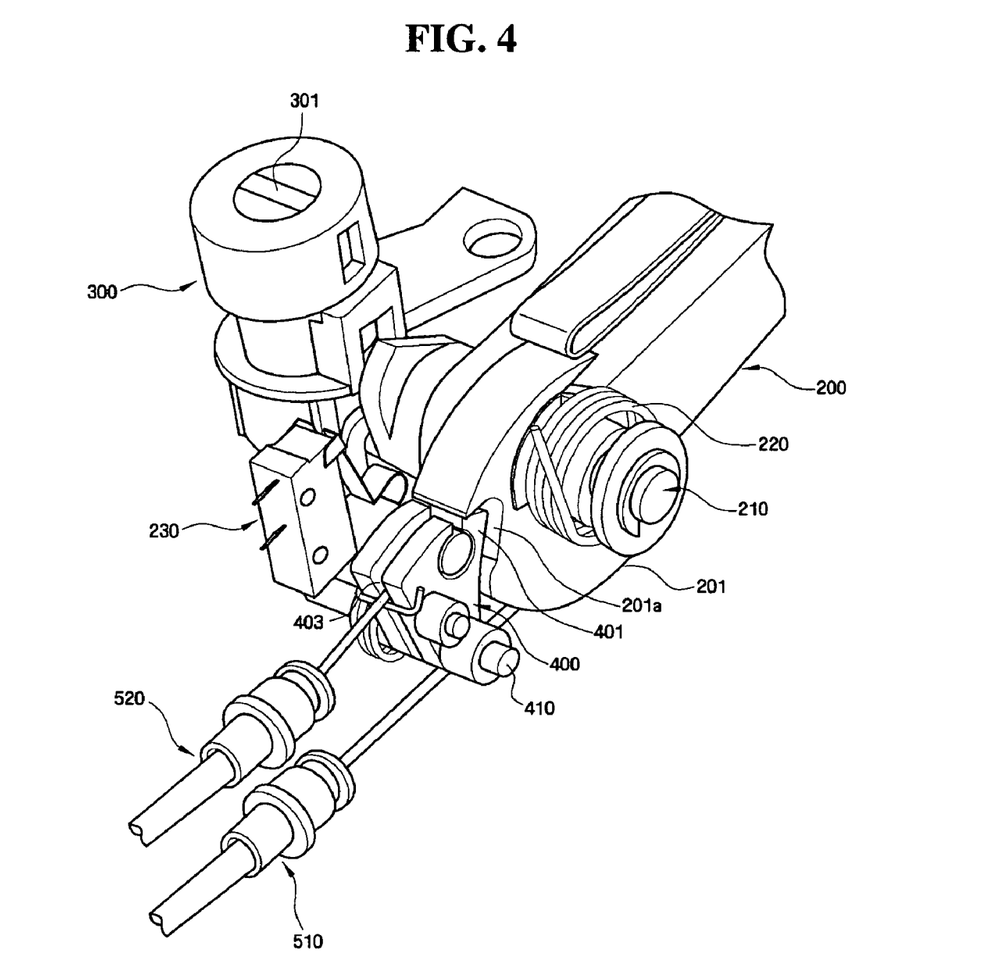
FIG. 4 is a schematic perspective view of the apparatus of FIG. 2 with the housing removed.
Figure 5:
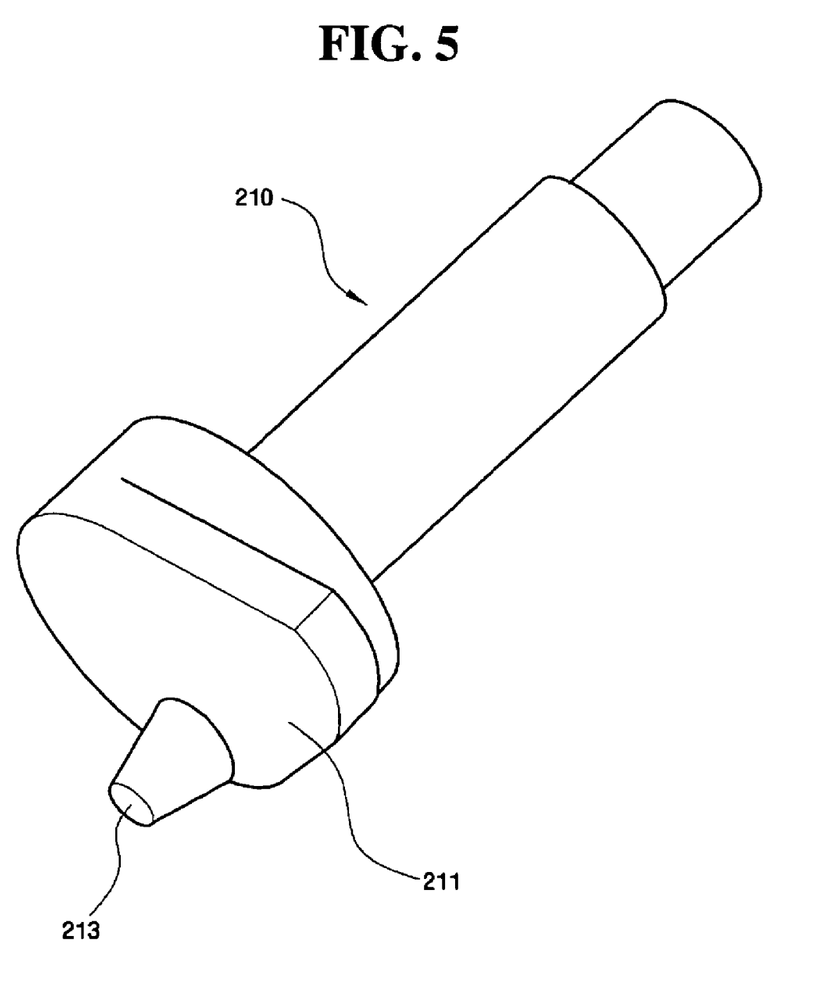
FIG. 5 is an enlarged detailed view of the lever shaft shown in FIG. 3.
Figure 6:
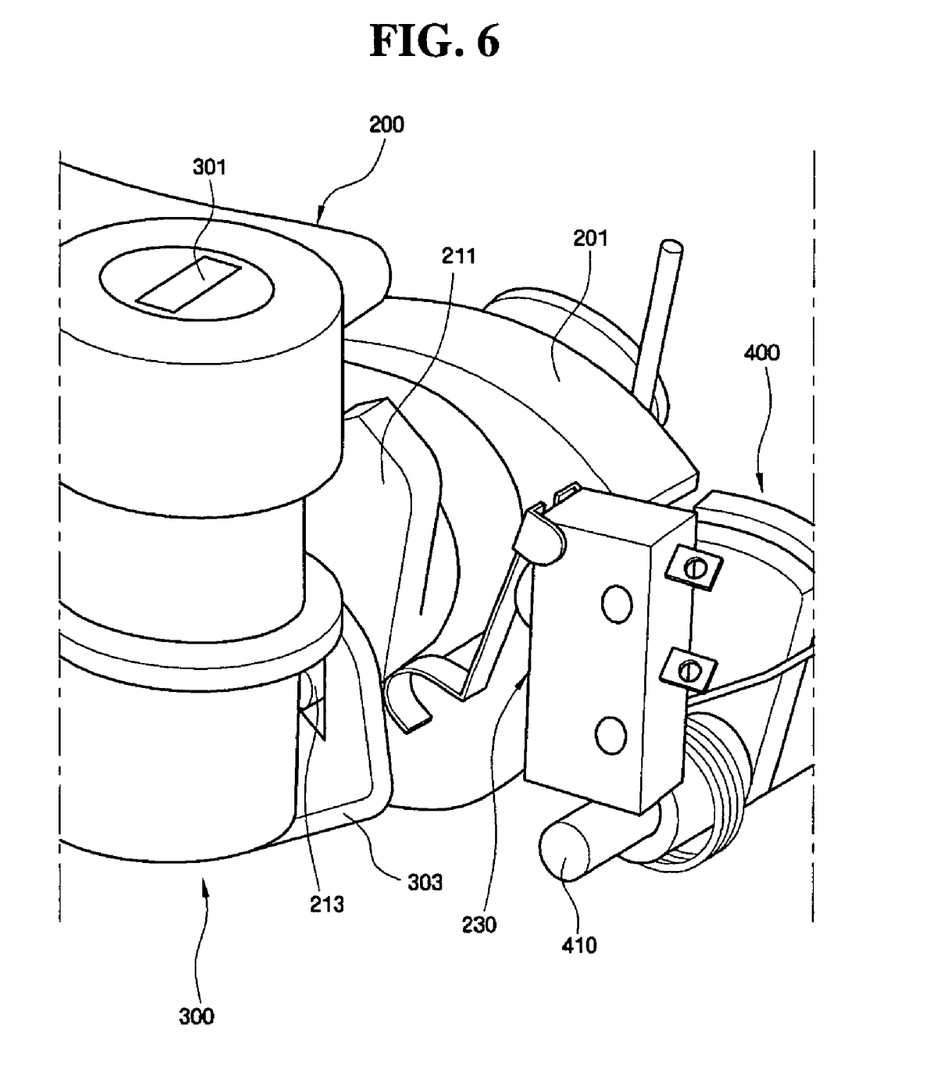
FIG. 6 is an enlarged detailed view of a portion 'A' in the apparatus of FIG. 2.
Figure 7:
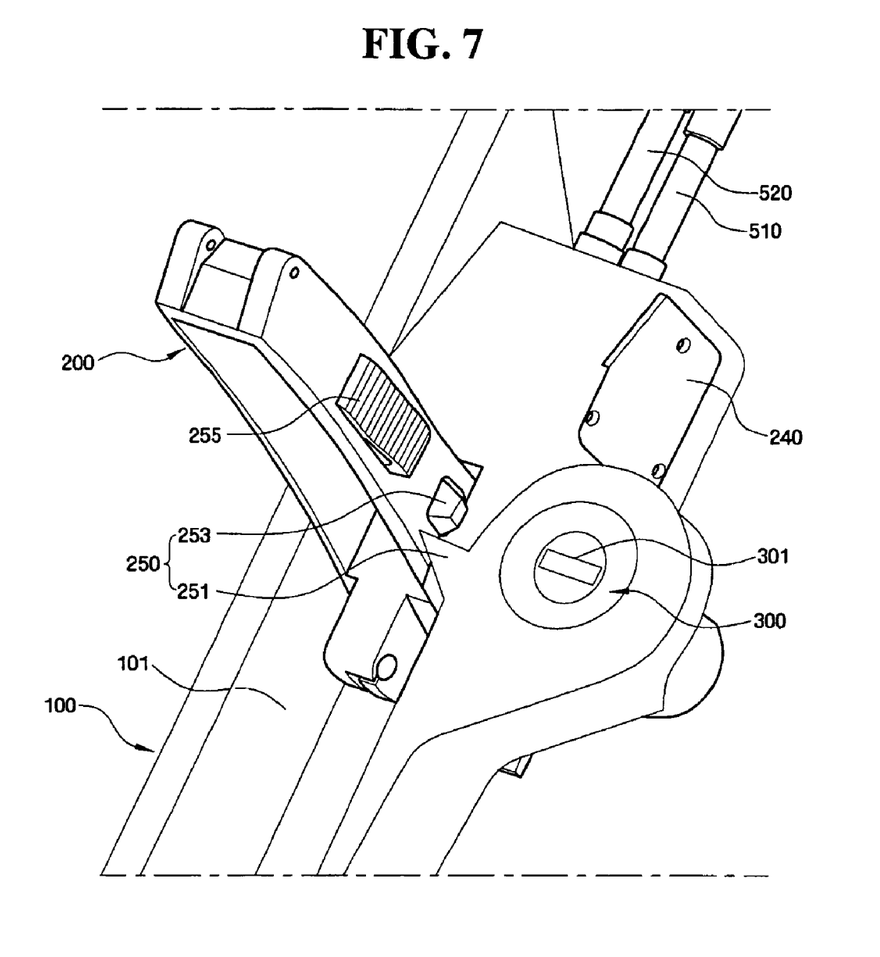
FIG. 7 is a perspective view of a snap lock unit for the apparatus of FIG. 2.

FIG. 2 is a schematic perspective view of a hand-operated control lever release apparatus for a transmission of a vehicle according to an embodiment of the present invention, FIG. 3 is an exploded perspective view of the apparatus of FIG. 2, FIG. 4 is a schematic perspective view of the control lever release apparatus of FIG. 2 with the housing removed, FIG. 5 is an enlarged detailed view of the lever shaft shown in FIG. 3, FIG. 6 is an enlarged detailed view of a portion 'A' in the apparatus of FIG. 2, and FIG. 7 is a perspective view of a snap lock unit for the apparatus of FIG. 2.

Referring to FIGS. 2 through 7, hand-operated control lever release apparatuses for a transmission of a vehicle according to embodiments of the present invention may include a housing 100, a manual release lever 200, a key assembly 300, a brake cam 400, and first and second cables 510 and 520.

The housing 100 may be secured on a frame (not shown) near a driver's seat within a vehicle.

The housing 100 includes a lever holder 101 that is formed to a predetermined depth at a top thereof so as to receive the manual release lever 200.

The housing 100 further includes a longitudinal key hole 103 formed in close proximity to the lever holder 101 so as to accommodate the key assembly 300.

The housing 100 further includes first and second cable holes 105 and 106 at its ends, through which the first and second cables 510 and 520 penetrate, respectively.

The manual release lever 200 is pivotally coupled to a lever shaft 210 so as to be rotatably installed on the housing 100.

A resilient member 220 is disposed between the housing 100 and the manual locking lever 200 and provides a rotational return force to the manual release lever 200.

The resilient member 220 includes a return spring (denoted hereinafter by the reference numeral '220') coupled to the lever shaft 210 and having two ends respectively supporting the housing 100 and the manual release lever 200.

The lever shaft 210 has a switch operating cam 211 at its one end, which operates the lever switch 230 that senses the rotational movement of the manual release lever 200 by pushing the lever switch 230 in response to rotation of the manual release lever 200. The lever shaft 210 also has a washer 222 and an E-ring 224 fitted to the other end thereof. The lever switch 230 is enclosed and protected by a switch cover 240 which is coupled to the housing 100 by screws 241.

Rotating upward, the manual release lever 200 is snap locked to the housing 100 by a snap lock unit 250.

The snap lock unit 250 includes a snap protrusion 251 projecting from one side of the lever holder 101 of the housing 100 and a snap-fit 253 protruding from one side of the manual release lever 200 so that it is engaged with and snap-locked to the snap protrusion 251 when the manual release lever 200 rotates upward at approximately 90 degrees.

The manual release lever 200 includes a snap release button 255 to release a snap connection between the snap protrusion 251 and the snap-fit 253.

The manual release lever 200 also includes a lever cam 201 at its one end that is pivotally coupled to the housing 100.

The lever cam 201 includes a guide groove 201b that is formed on an outer circumference and inserts and guides the first cable 510 to prevent separation and a cam groove 201a accommodating a portion of a brake cam 400.

The key assembly 300 is rotatably inserted into the key hole 103 formed in the housing 100.

The key assembly 300 has a cylindrical shape with an outer diameter less than an inner diameter of the key hole 103 and has a key insert 301 at a top for inserting a vehicle key (not shown).

The key assembly 300 is disposed substantially orthogonal to the lever shaft 210 and locks or releases rotation of the manual release lever 200. More specifically, the key assembly 300 has a key protrusion 303 formed on the outer circumference while the lever shaft 210 has a lever protrusion 213 axially projecting from an end surface. Rotation of the key assembly 300 causes the key protrusion 303 to engage or disengage the lever protrusion 213, thereby locking or releasing rotation of the lever shaft 210 that pivotally couples the manual release lever 200 to the housing 100.

The brake cam 400 is pivotally coupled to the cam shaft 410 so as to be rotatably installed on the housing 100.

The brake cam 400 is arranged in a line with the manual release lever 200 and has a projecting portion 401 inserted into a cam groove 201a of the lever cam 201 so that its rotation is limited by the manual release lever 200.

The brake cam 400 also has a guide groove 403 that is formed on an outer circumference and inserts and guides the second cable 520 so as to prevent separation.

Figure 11:
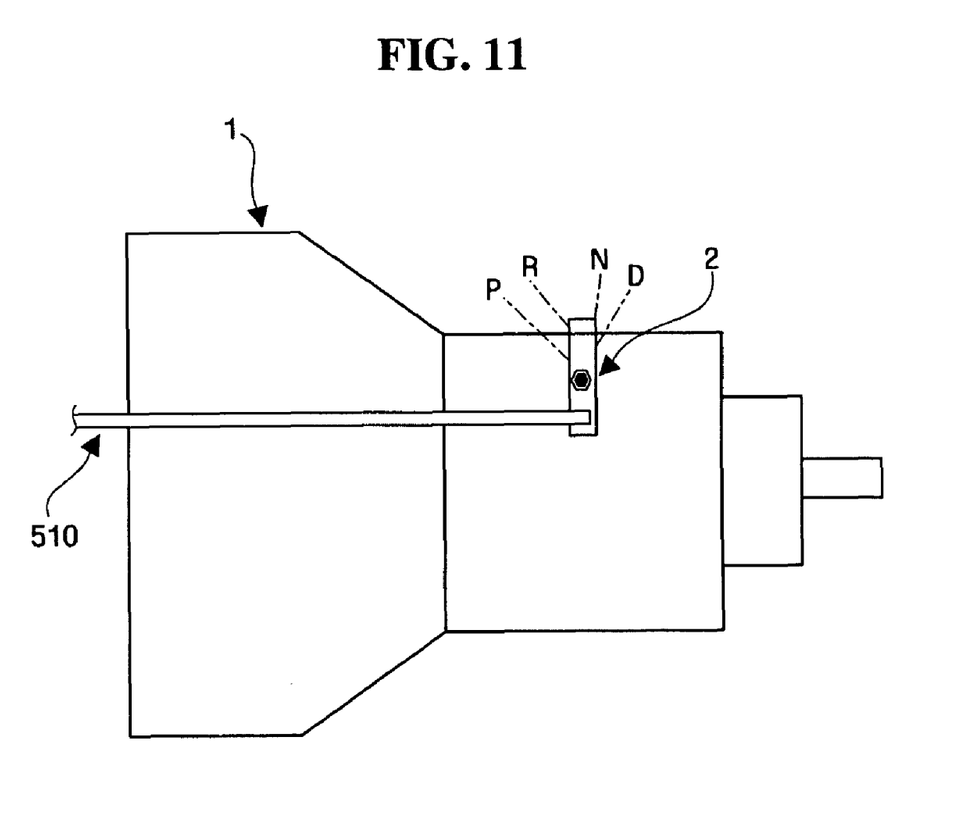

The first cable 510 penetrates a first cable hole 105 of the housing 100 and connects the manual release lever 200 to a control lever 2 for a transmission (1 in FIG. 11).

More specifically, the first cable 510 has one end coupled to the lever cam 201 of the manual release lever 200 and the other end rotatably inserted into the control lever 2. The manual release lever 200 rotates so as to unlock the control lever 2 while maintaining a predetermined tensile force on the first cable 510.

The control lever 2 for the transmission 1 serves to select one of transmission range positions Park (P), Reverse (R), Neutral (N), and Drive (D).

According to the present invention, the first cable 510 extending from the hand-operated release apparatus is coupled to the control lever 2. Rotation of the manual release lever 200 causes the first cable 510 to operate and the control lever 2 to rotate so that the control lever 2 shifts from P position to N or D position.

Figure 7A:
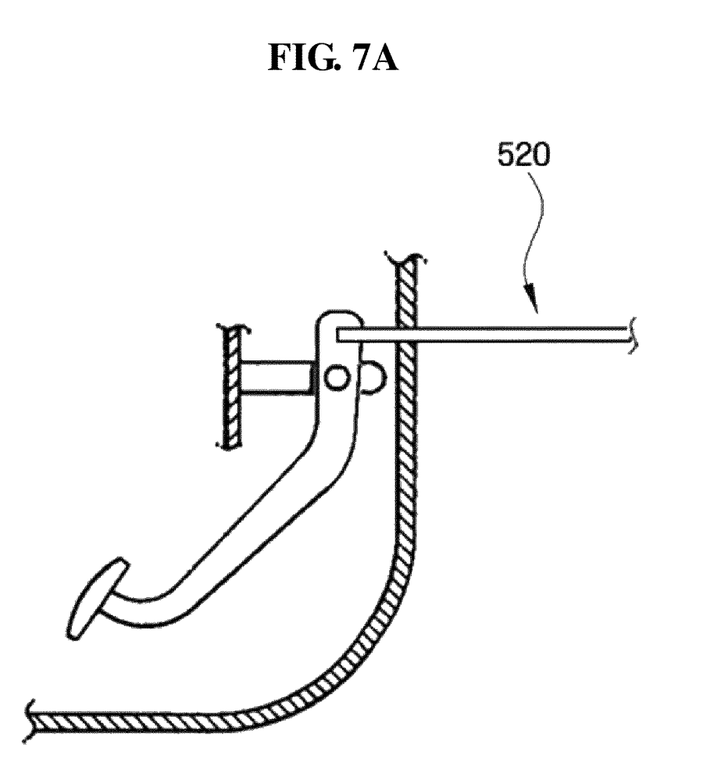
FIG. 7A is a perspective view of a cable attached to a brake pedal.

The second cable 520 penetrates the second cable hole 106 of the housing 100 and connects the brake cam 400 with a brake pedal (see FIG. 7A). More specifically, the second cable 520 has one end coupled to the brake cam 400 and the other end to the brake pedal.

A capable plate 530 may be attached to the housing 100 so as to surround the first and second cable holes 105 and 106.

The operation of a hand-operated control lever release apparatus for a transmission of a vehicle according to an embodiment of the present invention will now be described in detail with reference to FIGS. 8 through 11.

FIGS. 8 through 11 are diagrams for explaining the operation of a hand-operated control lever release apparatus for a transmission of a vehicle according to an embodiment of the present invention.

Figure 8:
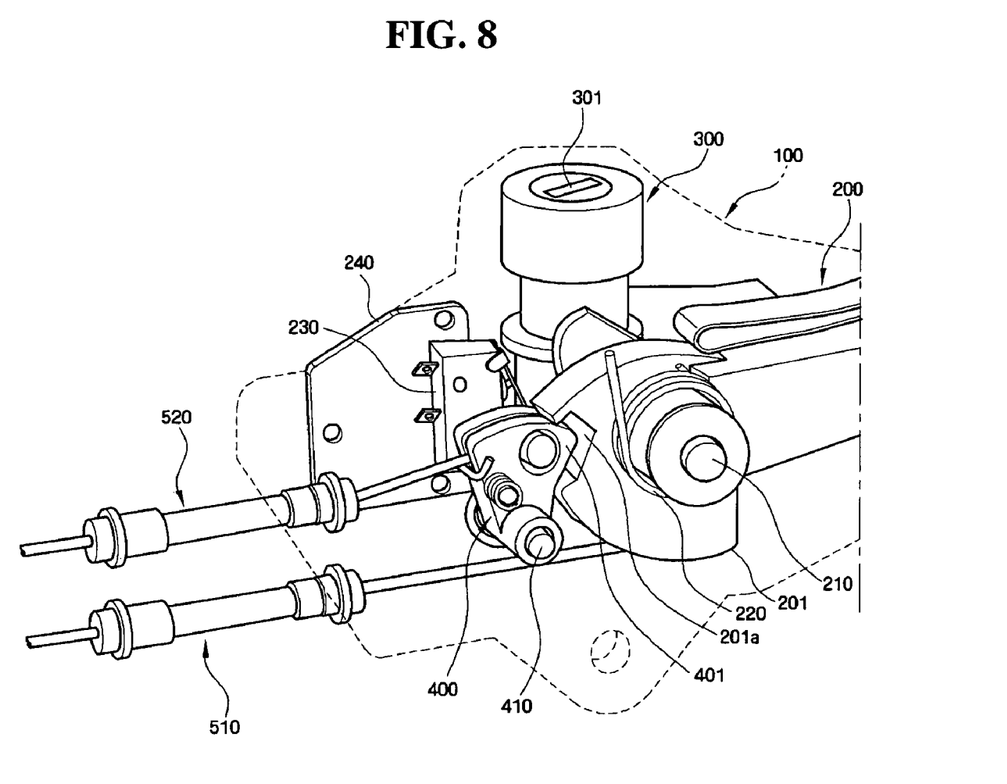
FIGS. 8 through 11 are diagrams for explaining the operation of a hand-operated control lever release apparatus for a transmission of a vehicle according to an embodiment of the present invention.

Referring to FIG. 8, when the control lever 2 for the transmission 1 is locked at P position, the manual release lever 200 does not rotate because the lever protrusion 213 of the lever shaft 210 meshes with the key protrusion 303 of the key assembly 300. In this case, since the projecting portion 401 of the brake cam 400 is inserted and engaged into the cam groove 201a of the manual release lever 200, the brake cam 400 coupled to the second cable 520 will not rotate even if a driver steps on the brake pedal. Thus, a vehicle can be parked in a safe state when the control lever 2 is locked at P position.

Figure 9:
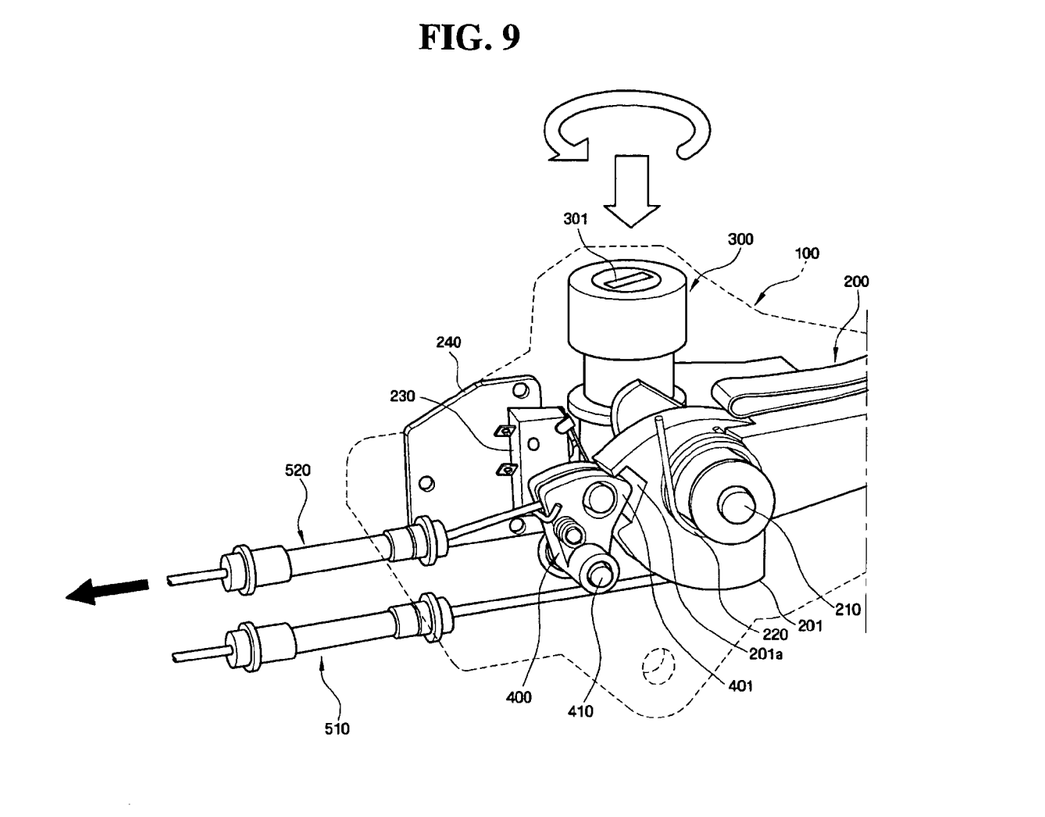

Referring to FIG. 9, in order to unlock the control lever 2 from P position, the key assembly 300 first rotates after inserting a vehicle key into the key insert 301 of the key assembly 300. The rotation of the key assembly 300 causes the lever protrusion 213 to disengage from the key protrusion 303 so that the manual release lever 200 becomes rotatable. When the driver steps on a brake pedal in this state, the second cable 520 operates, causing the brake cam 400 to disengage from the lever cam 201 and rotate.

Figure 10:
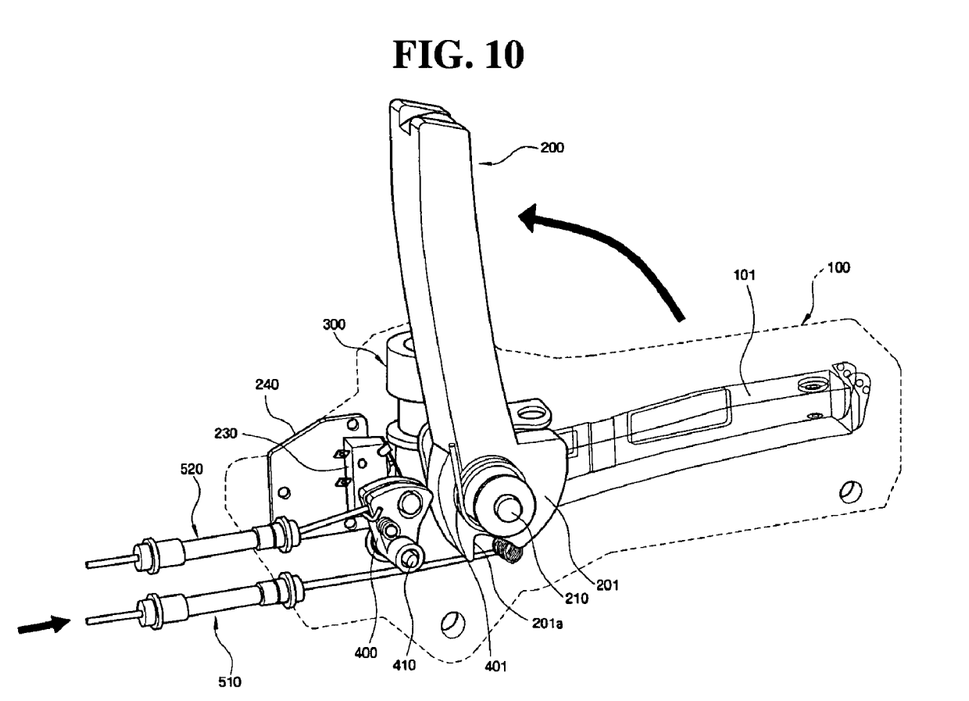

Further, referring to FIG. 10, the upward rotating of the manual release lever 200 causes the first cable 510 coupled to the lever cam 201 of the manual release lever 200 to operate. Referring to FIG. 11, as the first cable 510 operates, the control lever 2 coupled to the first cable 510 is manually unlocked from P position as described so that it is shifted from the P position to R, N, and D positions in order.

Thus, by manually unlocking the control lever 2 from P position as described above, drivers can take proper action, such as movement of a vehicle in the event of an emergency.

Further, when the manual release lever 200 rotates upward, the snap-fit 253 protruding from a side of the manual release lever 200 is engaged with the snap protrusion 251 projecting from a side of the housing 100 so that the manual release lever 200 remains upwardly snap-locked.

Pressing the snap release button 255 mounted on the manual release lever 200 causes releasing a snap connection between the snap-fit 253 and the snap protrusion 251, so that the manual release lever 200 returns to the original position by resilience of the return spring 220.

The above-mentioned hand-operated control lever release apparatuses for an electronic transmission of a vehicle according to embodiments of the present invention can manually unlock the control lever for the electronic transmission in response to rotation of a manual release lever, thereby actuating the movement of the vehicle in the event of an emergency.

The effects of the present invention should not be limited to the foregoing description, and additional effects and advantages of the invention will be made more apparent to those skilled in the art from the spirit and scope of the invention as defined by the appended claims.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A hand-operated control lever release apparatus for a transmission of a vehicle, the apparatus comprising:
 a housing;
 a manual release lever rotatably mounted in the housing;
 a brake cam which is rotatably coupled to the housing through a cam shaft and the rotation of which is restrained by the manual release lever;
 a first cable connecting the manual release lever to a control lever for the transmission and being able to unlock the control lever in response to rotation of the manual release lever; and
 a second cable connecting the brake cam to a brake pedal.

2. The apparatus of claim 1, wherein the housing includes a lever holder for receiving the manual release lever.

3. The apparatus of claim 1, wherein the manual release lever is pivotally coupled to the housing through a lever shaft.

4. The apparatus of claim 3, further comprising a resilient member that is disposed between the housing and the manual release lever and provides a rotational return force to the manual release lever.

5. The apparatus of claim 4, wherein the resilient member is a spring coupled to the lever shaft and having two ends respectively supporting the housing and the manual release lever.

6. The apparatus of claim 3, further comprising a lever switch that is mounted to the housing and senses the rotational movement of the manual release lever.

7. The apparatus of claim 6, wherein the lever shaft has a switch operating cam which operates the lever switch by pushing the lever switch in response to rotation of the manual release lever.

8. The apparatus of claim 1, wherein the manual release lever is snap locked to the housing by a snap lock unit when it rotates upward.

9. The apparatus of claim 8, wherein the snap lock unit includes a snap protrusion formed on the housing and a snap-fit mounted to the manual release lever so that it is engaged with and snap-locked to the snap protrusion when the manual release lever rotates upward.

10. The apparatus of claim 9, wherein the manual release lever has a snap release button to release a snap connection between the snap protrusion and the snap-fit.

11. The apparatus of claim 1, wherein the manual release lever has a lever cam at a portion to which the first cable is coupled.

12. The apparatus of claim 11, wherein a guide groove is formed on an outer circumference of the lever cam, and the first cable is inserted and guided in the guide groove to prevent separation.

13. The apparatus of claim 11, wherein the lever cam includes a cam groove for receiving a portion of the brake cam.

14. The apparatus of claim 1, wherein a guide groove is formed on an outer circumference of the brake cam, and the second cable is inserted and guided in the guide groove to prevent separation.

15. The apparatus of claim 1, further comprising a key assembly that is fitted in the housing and locks or releases rotation of the manual release lever.

16. The apparatus of claim 15, wherein the key assembly is rotatably inserted into a key hole formed in the housing.

17. The apparatus of claim 15, wherein the key assembly locks or releases rotation of the lever shaft that pivotally couples the manual release lever to the housing.

18. The apparatus of claim 17, wherein the key assembly is disposed substantially orthogonal to the lever shaft.

19. The apparatus of claim 18, wherein the key assembly has a key protrusion formed on the outer circumference, the lever shaft has a lever protrusion projecting from an end surface, and key protrusion is engaged or disengaged with lever protrusion in response to rotation of the key assembly.

* * * * *